United States Patent [19]

vanBuul et al.

[11] Patent Number: 4,492,976

[45] Date of Patent: Jan. 8, 1985

[54] LINE STANDARD CONVERSION CIRCUIT FOR A TELEVISION SIGNAL

[75] Inventors: Marinus C. W. vanBuul, Breda; Johannes G. Raven; Wilhelmus H. C. A. van de Ven, both of Eindhoven, all of Netherlands

[73] Assignee: U.S. Philips Corporation, New York, N.Y.

[21] Appl. No.: 416,736

[22] Filed: Sep. 10, 1982

[30] Foreign Application Priority Data

Oct. 6, 1982 [NL] Netherlands ............... 8104532

[51] Int. Cl.³ ............................................ H04N 9/42
[52] U.S. Cl. ................................................... 358/11
[58] Field of Search .............. 358/11, 12, 140, 141, 358/312, 152, 31

[56] References Cited

U.S. PATENT DOCUMENTS

4,057,835 11/1977 Kinuhata et al. ............... 358/140
4,322,750 3/1982 Lord et al. ......................... 358/140

OTHER PUBLICATIONS

Kinuhata et al., "A Digital Standards-Converter for TV Using Intra-Frame Line Interpolation Techniques", Intern. Conf. on Comm., Jun. 17-19, 1974, IEEE.

*Primary Examiner*—Michael A. Masinick
*Assistant Examiner*—Erin A. McDowell
*Attorney, Agent, or Firm*—Thomas A. Briody; William J. Streeter; Marianne Rich

[57] ABSTRACT

A television receiving system for converting a video signal of one line standard to a video signal of another line standard. A field delay circuit is provided which separates the video signal of the one line standard into a high frequency and low frequency portion. The low frequency portion of the signal is processed to have a delay during one field different from the delay of a subsequent field. Independent processing means for the high frequency portion of the separated signal is provided. The processed high frequency and low frequency signals are combined to provide a video signal for converting to a different line standard. By processing the high frequency and low frequency portions of the video signal differently, a savings in hardware components is realized without material degradation in performance.

8 Claims, 2 Drawing Figures

LINE STANDARD CONVERSION CIRCUIT FOR A TELEVISION SIGNAL

The invention relates to a line standard conversion circuit for a television signal, comprising a field delay circuit for obtaining information from a previous field of a television signal to be converted and processing this information in a present field of a television signal converted by the line standard conversion circuit.

Netherlands patent application No. 7706512 (PHN 8821), and its U.S. counterpart, Ser. No. 417,783, filed Sept. 13, 1982, discloses a line standard conversion circuit of the above-described type. A field delay circuit for such a line standard converter requires many circuit elements.

The invention has for its purpose to limit the number of circuit elements of the field delay circuit, or to increase the number of its functions.

SUMMARY OF THE INVENTION

According to the invention, a line standard converter is provided wherein the field delay circuit comprises a separation circuit for separating the television signal into a high-frequency and a low-frequency portion, and processing of information from the previous field of the television signal to be converted during a present field of the converted television signal is effected only in the low-frequency portion, while the high-frequency portion is processed in a different manner.

Applicants have found that for positioning or interpolation purposes it is sufficient to process the low-frequency portion of the television signal of the previous field in an adequate manner during the present field, and to process the high-frequency portion of the television signal in a different manner. For example, the high-frequency portion of the present new field may be interpolated from lines of the present original field or the high-frequency portion of a field or line may be subject to a comb filtering operation, depending, for example, on movement in the picture.

The invention will now be further explained by way of example with reference to the accompanying drawing.

DESCRIPTION OF THE PREFERRED EMBODIMENT

Figure 1:
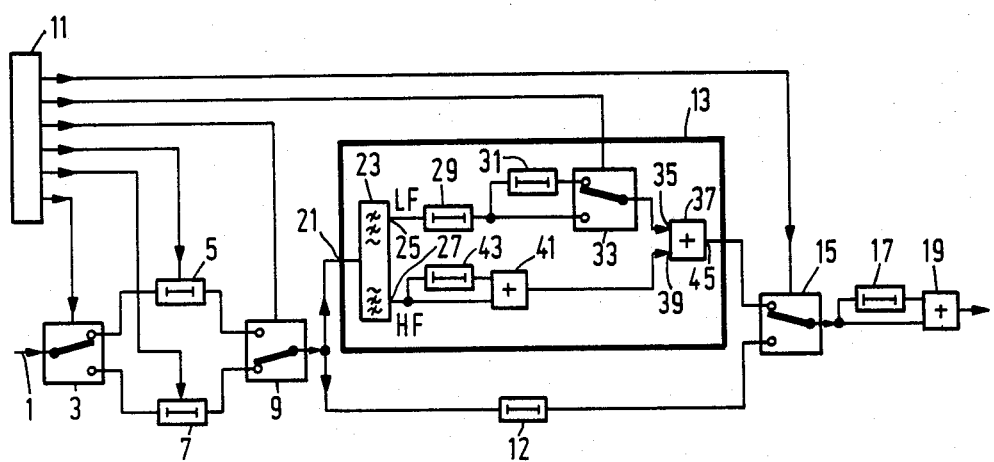
FIG. 1 illustrates by means of a block schematic circuit diagram a possible embodiment of a line number doubling circuit in accordance with the invention.

In FIG. 1, a television signal to be converted is applied to an input 1 and written into a line store 5 through a change-over switch 3. From a second line store 7 a television signal which was written into this second store in the preceding line period is then read at twice the speed through a change-over switch 9. The change-over switches 3 and 9 and the line stores 5 and 7 are controlled by a pulse generator 11. The functions of the line stores 5 and 7 change every alternate line so that each time a line of the television signal to be converted is applied to the input 1 the change-over switch 9 supplies a signal for a line at twice the speed of the input line.

This signal of twice the speed is applied through a delay line 12 having a time delay of one line period for the signal having twice the speed, and through a field delay circuit 13 to a change-over switch 15 which is also controlled by the pulse generator and which is in one position during a line period of the television signal having twice the speed of an input line and in the other position during a subsequent line period.

As a result a signal from the change-over switch 9 and a signal from the field delay circuit 13 are alternately applied to a line interpolation circuit which is connected to an output of the change-over switch 15. The line interpolation circuit has a delay line 17 having a time delay of one line period, and an adder circuit 19 combining a delayed and undelayed line signal.

The above-described circuit largely corresponds to the circuit disclosed in the Netherlands Patent Application No. 7706512 (PHN 8821), and its U.S. counterpart, Ser. No. 417,783, so that reference is made to said circuit to explain its operation.

The field delay circuit 13 deviates from the field delay circuit described in the publication. From an input 21 a signal applied to the field delay circuit 13 is conveyed to a separation circuit 23 as a result of which the low-frequency portion of the television signal is obtained at an output 25 of said separation circuit 23 and the high-frequency portion is obtained at an output 27. A delay line 29 having a time delay of one field period minus half a line period of the television signal of twice the speed the low-frequency portion is connected to a delay line 31 having a time delay of one line period of the television signal of twice the speed and also connected to an input of the change-over switch 33. The delay line 31 applies its signal to a further input of the change-over switch 33, an output of which is connected to an input 35 of an adder circuit 37. A further input 39 of the adder circuit 37 is connected to an output of an adder circuit 41 to which the high-frequency portion of the television signal is applied and to a delay line 43 having a time delay of two line periods of the television signal having a line period twice the normal speed.

The change-over switch 33 is controlled by the pulse generator 11 and assumes another position every alternate field. A signal as to its low-frequency portion is delayed alternately in one field by a field period minus half a line period and in the other field by a field period plus half a line period, and as to its high-frequency portion is interpolated from two consecutive lines of the present field and produced at an output 45 of the adder circuit 37 which at the same time constitutes the output of the field delay circuit 13.

As regards the low-frequency portion of the television circuit the operation of the circuit is the same as described in the above-mentioned publication.

Applicants have found that substantially the same improvement in picture quality is obtained by conveying the high-frequency portion of the television signal through the interpolation circuit 41, 43 instead of through the delay circuit 29, 31, 33, so that a considerable saving in circuit elements can be realized in said delay circuit 29, 31, 33.

Figure 2:
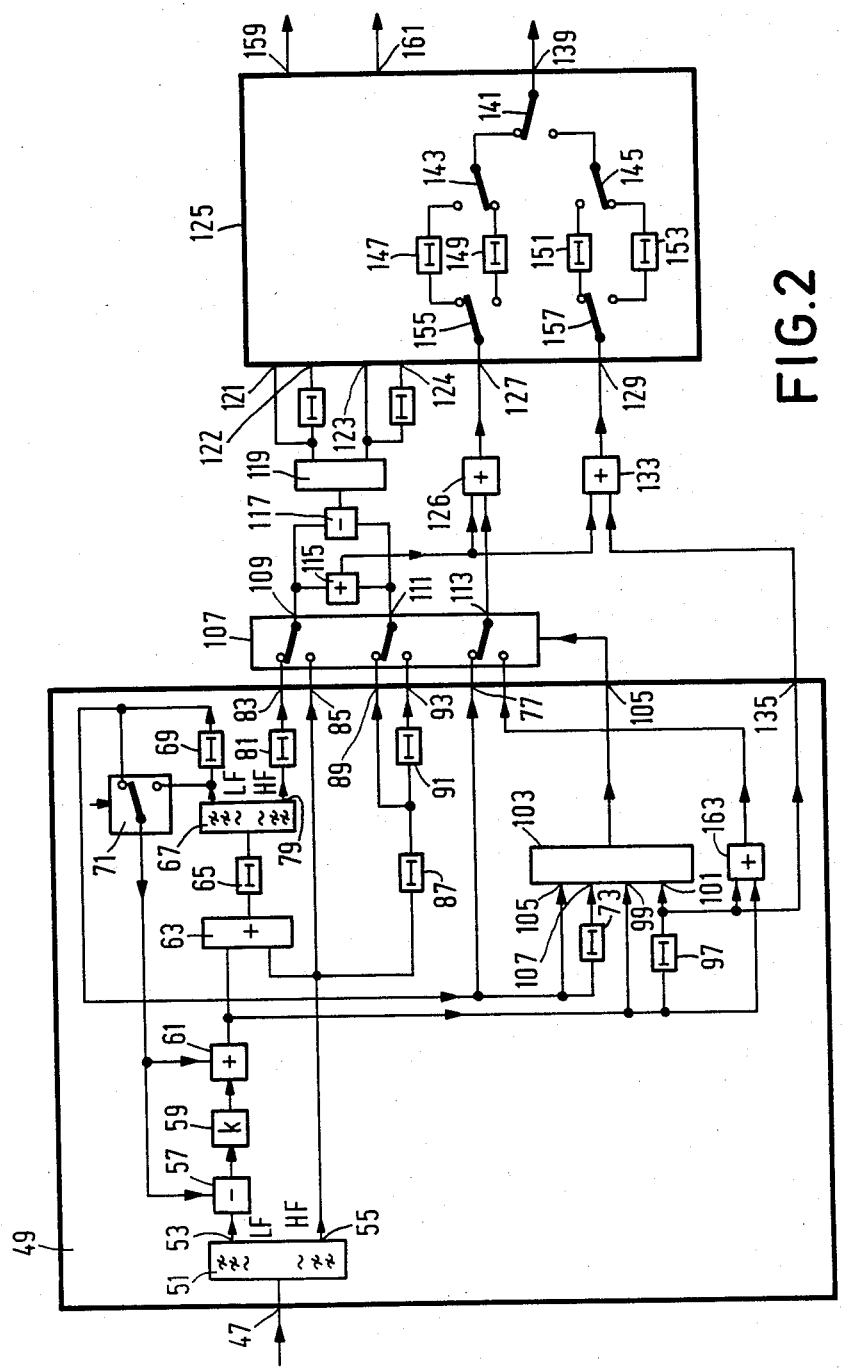
FIG. 2 illustrates, also by means of a block schematic circuit diagram another possible embodiment of a line number doubler in accordance with the invention.

In FIG. 2, a television signal to be converted, in this case a PAL colour television signal, is applied to an input 47 of a field delay circuit 49. By means of a first separation circuit 51 connected to the input 47 this signal is separated into a low-frequency portion, which is applied to an output 53 and a high-frequency portion, which is applied to an output 55 thereof. The high-frequency portion also comprises the chrominance signal.

The low-frequency portion is conveyed to a noise suppression circuit comprising a subtracting circuit 57, an attenuation circuit 59 having a variable attenuation k, a first adder circuit 61, a second adder circuit 63, a delay line 65 having a time delay of one field period minus half a line period, a second separation circuit 67, a delay line 69 having a time delay of one line period and a change-over switch 71 which during a field period connects further inputs of the adder and subtracting circuits 61, 57 to the input and during a subsequent field period to the output of the delay line 69. In response thereto there is produced at the output of this delay line 69 a low-frequency portion in which the noise is suppressed and which is delayed by one field period less half a line period with respect to the signal at the output 53 of the separation circuit 51. This signal is applied to an output 77 of the field delay circuit 49.

From the output 55 of the first separation circuit 51 the high-frequency portion is applied to the second adder circuit 63 whereafter it is passed through the delay line 65 and appears at a high-frequency output 79 of the second separation circuit 67 and is then applied to an output 83 of the field delay circuit 49 through a delay line 81 having a time delay of one line period.

The low-frequency portion with suppressed noise and with a delay of one field period plus half a line period is applied to the output 77 of the field delay circuit 49 and the high-frequency portion with a delay of one field period plus half a line period is applied to the output 83.

In addition, the output 55 of the first separation stage 51 applies the undelayed high-frequency portion to an output 85 of the field delay circuit 49 the high-frequency portion with a delay of one line period to an output 89 via a delay line 87 having a time delay of one line period and the high-frequency portion with a delay of two line periods to an output 93 via a further delay line 91.

The movement detector 103 which may be, for example, of the type as described in the Netherlands patent application No. 8004312 (PHN 9814), having a U.S. counterpart, Ser. No. 282,128, filed July 10, 1981, receives the low-frequency portion of the television signal associated with four position-sequential lines of a picture coming from two time-sequential lines of one field and two time-sequential lines of the subsequent field. This low-frequency portion appears to contain sufficient information to ensure an efficient operation of the movement detector 103. A signal indicating whether there is movement or no movement in the picture is supplied by the movement detector 103 from an output 105 of the field delay circuit 49. This signal operates a change-over switch 107.

When there is movement the change-over switch 107 is in the position not shown in the drawing and when there is no movement it is in the position shown.

The change-over switch 107 has three outputs 109, 111, 113. The outputs 109 and 111 are connected to an adder circuit 115 and to a subtracting circuit 117.

If there is no movement in the picture then the adder circuit 115 supplies the sum and the subtracting circuit 117 the difference of the signals from the outputs 83 and 89 of the field delay circuit 49. These signals are delayed by one field period with respect to each other, so that a field comb filter is formed which supplies from the output of the adder circuit 115 a field comb-filtered high-frequency portion of the luminance signal and from the output of the subtracting circuit 117 a field comb-filtered PAL chrominance signal.

If there is movement in the picture the adder circuit 115 supplies the sum and the subtracting circuit 117 the difference of the signals at the outputs 85 and 93 of the field delay circuit 49. These signals are delayed by two line periods with respect to each other, so that a dual-line comb filter is formed which supplies a dual-line comb-filtered high-frequency portion of the luminance signal from the output of the adder circuit 115 and from the output of the subtracting circuit 117 a dual-line comb-filtered PAL chrominance signal.

The chrominance signal at the output of the subtracting circuit 117 is applied to a demodulation circuit 119, which applies colour difference signals to two inputs 121, 123 of a converter 125 and the same colour difference signals with a delay of one line period to two inputs 122, 125 of that converter.

The output 113 of the change-over switch 107 is connected to an input 127 of the converter 125 through an adder circuit 126. A further input of the adder circuit 126 is connected to the output of the adder circuit 115. An input 129 of the converter 125 is connected to an output of an adder circuit 133 which adds the signal at the output of the adder circuit 115 to the signal to an output 125, which is connected to the input 101 of the movement detector 103, of the field delay circuit 49.

A signal which will be denoted the intermediate signal is applied to the input 127 of the converter 125 and a signal which will be denoted the corresponding signal is applied to the input 129.

When the number of lines is doubled, the number of lines of each field is doubled so that in each field of the picture having twice the number of lines there are lines which as regards their position substantially correspond to lines of a picture which would be obtained with the original television signal and intermediate lines whose positions are located between these positionally corresponding lines.

In the positionally corresponding lines the corresponding signal at the input 129 and in the intermediate lines the intermediate signal at the input 127 are brought to twice the speed by the converter 125 and are supplied from an output 139 thereof in the form of a converted signal.

The output 139 of the converter 125 is connected to a change-over switch 141 which occupies a different position in each line period of the converted signal and connects the output of a change-over switch 143 or a change-over switch 145 to the output 139 of the converter 125.

The change-over switches 143 and 145 switch the outputs of a pair of line registers 147, 149 and 151, 153, respectively, whose inputs are connected to a change-over switch 155 and 157, respectively, which are connected to the respective inputs 127 and 129 of the converter.

For each line period of the television signal to be converted the change-over switches 143, 145, 155, 157 occupy a different position. The line registers 147, 151 and 149, 153, respectively are written-in alternately at a predetermined rate while the line registers 149, 153 and 147, 151, respectively are read at twice the speed in the proper time periods. Such operations who are effected on the colour difference signals which are applied to the inputs 121, 122 and 123, 124 of the converter, resulting in converted colour difference signals being produced at two outputs 159, 161 thereof.

In the absence of movement, the corresponding signal at the input 129 of the converter 125 is the sum of the low-frequency portion, from which the noise has been removed, of the signal to be converted of the present field obtained from the output 135 of the field delay circuit, and the field comb-filtered high-frequency portion of the luminance signal obtained from the adder circuit 115.

The intermediate signal at the input 127 of the converter 125 then is the sum of the low-frequency portion from which the noise has been removed, of the signal from the previous field and the field comb-filtered high-frequency portion of the luminance signal received from the adder circuit 115.

If there is movement, the corresponding signal at the input 129 of the converter is the sum of the low-frequency portion, from which the noise has been removed, of the signal to be converted of the present field obtained from the output 135 of the field delay circuit 49 and the dual-line comb-filtered high-frequency portion of the luminance signal obtained from the adder circuit 115.

The intermediate signal at the input 127 of the converter 125 then is the sum of a low-frequency portion from which the noise has been removed and which is the average of two lines of the present field, of the signal obtained from an adder circuit 163, whose inputs are connected to the inputs 99 and 101 of the movement detector 103, and the dual-line comb-filtered high-frequency portion of the luminance signal of the present field.

In principle, for the low-frequency portion of the signal this corresponds to the manner of doubling the number of lines, described in German Offenlegungsschrift No. 2,444,069, in which, owing to the fact that when there is no movement in the picture only the low-frequency portion of the information of the previous field is used, it is possible to extend the range of use of the delay line 65 for the intermediate line, this delay line now also serving for noise suppression, field comb-filtering and movement detection.

Although in the foregoing embodiments of line number doubling circuits are described, the invention is alternatively suitable for other types of line standard conversions, so conversions in which the ratio between the number of lines of the converted field and the number of lines of the field to be converted differs from two.

What is claimed is:

1. In a television receiving system for converting a signal of one line standard to a signal of another line standard, a field delay circuit connected to receive said signal of one line standard comprising:
   a separation circuit for dividing said signal of one line standard signal into a high frequency and a low frequency signal;
   first means for processing said low frequency signal to have a delay during one field different than the delay of a subsequent field;
   second processing means independent of said first processing means for receiving said high frequency signal; and
   means for combining signals from said first and second processing means to provide a combined video signal.

2. The field delay circuit of claim 1 wherein said second processing means includes a line interpolation circuit.

3. The field delay circuit of claim 1 further including a noise suppression circuit.

4. The field delay circuit of claim 1 further comprises a movement detector coupled to a field delay line.

5. The field delay circuit of claim 1 further including a field comb filter to provide luninance and chrominance signals.

6. A circuit for changing a video signal of a first number of lines to a second number of lines comprising:
   means for storing alternate lines of said video signal in first and second memories;
   means for alternately reading said stored lines from said memories at a rate twice the rate of said signal of said first number of lines;
   a field delay circuit connected to receive said read alternate lines, said field delay circuit including:
   means for separating said read alternate lines into a low frequency and high frequency signal;
   means connected to process said low frequency signal, including means for delaying said low frequency signals of alternate fields to a different extent than remaining fields;
   means connected to process said high frequency signal differently than said low frequency signals;
   means for combining processed high frequency signals with processed low frequency signals;
   a delay circuit connected to receive said alternately read stored lines; and
   means for alternately connecting a signal from said delay circuit and a signal from said means for combining to a line interpolation circuit.

7. A television receiving system for converting a signal of one line standard to a signal of another line standard comprising:
   a line conversion circuit having first and second inputs for receiving a first video line signal and a second video line signal, and providing from said signals a video signal of a different line standard;
   a first combining means connected to deliver said first video signal to said line conversion circuit;
   a second combining means connected to deliver said second video signal to said line conversion circuit;
   a delay circuit for providing from said video signal of a first line standard a plurality of signals including:
   a first substantially noise-free signal representing the low frequency content of said video signal of a previously received field;
   a second signal representing the high frequency portion of a video signal of a present field;
   a third signal representing the high frequency portion of a previous field;
   a fourth signal representing the high frequency portion of the present video signal field delayed by one line period;
   a fifth signal representing the high frequency portion of said video signal representing a present field delayed by two line periods;
   a sixth signal representing the average of two lines of a present field luminance signal;
   a seventh signal comprising a one line period delayed substantially noise-free signal representing the low frequency portion of a present field luminance signal, said seventh signal connected to an input of said second combining means;

a movement detector connected to said delay circuit to determine when said video signal represents a changing image;

switching means connected to be operated by said movement detector, said switching means having first through sixth inputs connected to receive said first through sixth signals, and first, second and third outputs, said third output connected to an input of said first combining means;

a summing network connected across said first and second outputs, and connected to a remaining input of said second combining means and the remaining input of said first combining means;

said switching means providing said third and fourth signals to said summing network, and said first signal to said first combining means during a first switching condition, and said second and fifth signals to said summing network and said sixth signal to said first combining means during a second switching state of said switching means.

8. The television receiving system of claim 7 further comprising:

a difference network connected across said switching means first and second outputs;

a color demodulator means connected to receive a signal from said difference network, whereby first and second color demodulated signals are derived; and means connecting said first and second color demodulated signals to said line conversion circuit.

* * * * *